United States Patent [19]

Guienne et al.

[11] 3,773,008
[45] Nov. 20, 1973

[54] FENDER DEVICE FOR SHIPS AND OTHER BOATS

[75] Inventors: Paul Francois Guienne, Paris; Jacques Francois Robert Prouhet, Les Clayes-sous-Bois, both of France

[73] Assignee: Bertin & Cie, Plaisir, France

[22] Filed: Jan. 26, 1972

[21] Appl. No.: 220,799

[30] Foreign Application Priority Data
Jan. 27, 1971  France .............................. 7102689

[52] U.S. Cl. ............................................... 114/219
[51] Int. Cl. ..................................................... B63b
[58] Field of Search ........................... 114/219, 230; 244/138 R; 61/6, 48

[56] References Cited
UNITED STATES PATENTS

| | | | |
|---|---|---|---|
| 3,585,802 | 6/1971 | Frankel | 114/230 X |
| 3,555,832 | 1/1971 | Narabu | 114/219 X |
| 3,276,414 | 10/1966 | Lee | 114/219 |
| 3,593,531 | 7/1971 | Saadeh | 61/48 |

Primary Examiner—Milton Buchler
Assistant Examiner—Gregory W. O'Connor
Attorney—Alfred W. Breiner

[57] ABSTRACT

A fender device is interposed between the hull of a ship and a wharf or the hull of another ship to absorb the shocks and generate a horizontal repulsion force to move them apart when they tend to approach each other. This fender device is submerged and comprises a deformable water-filled chamber surrounded by a waterproof flexible wall ending with a peripheral lip which defines, with the approaching structure, a daylight clearance for the leakage of water from the chamber upon crushing of the latter due to the approach movement.

11 Claims, 4 Drawing Figures

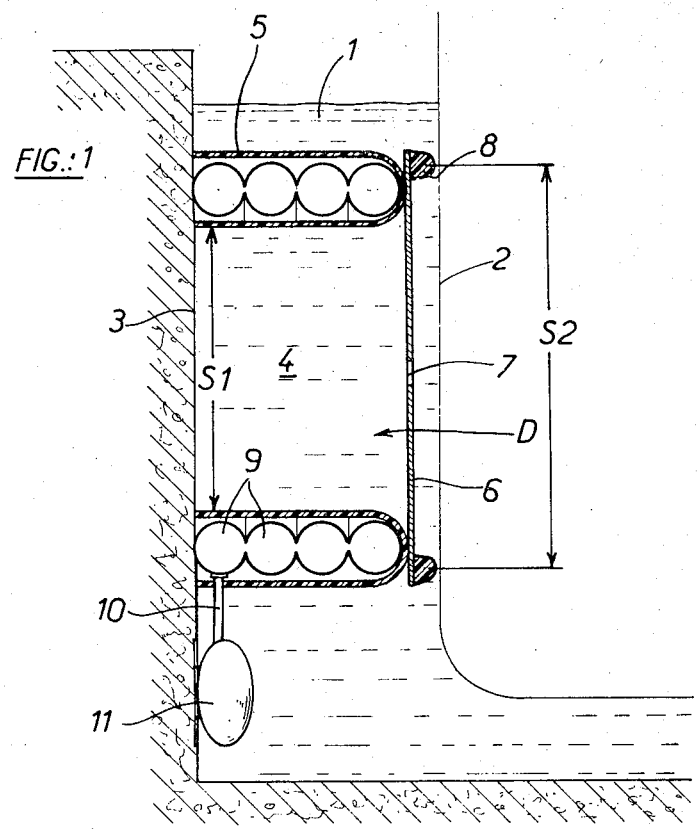
FIG.: 1
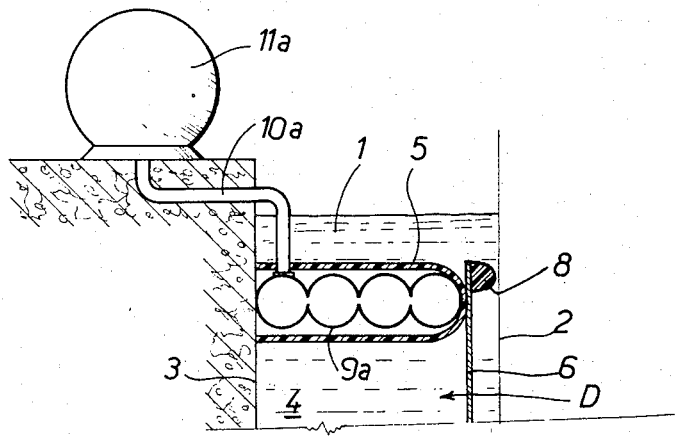
FIG.: 2

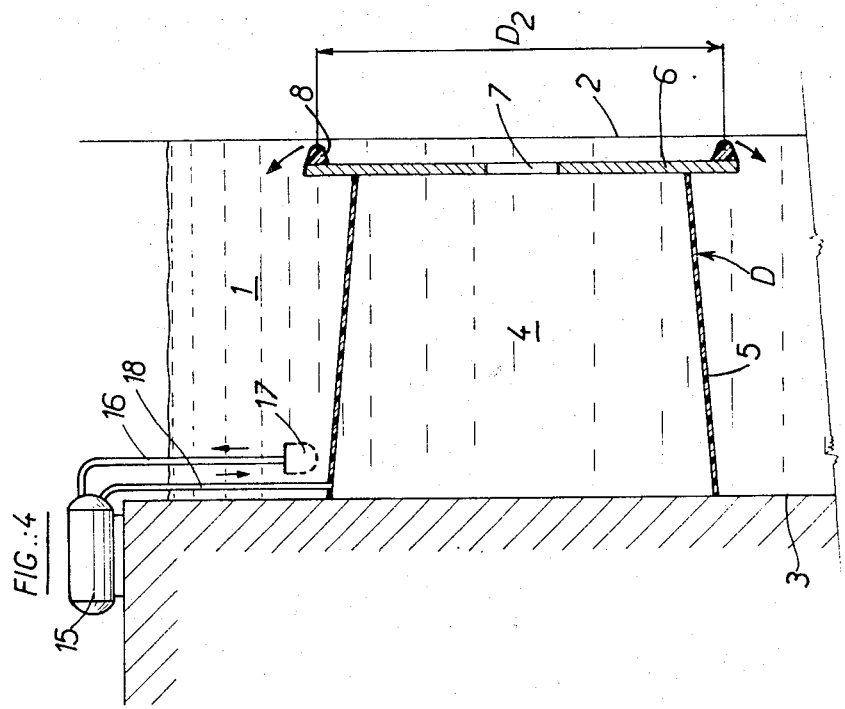
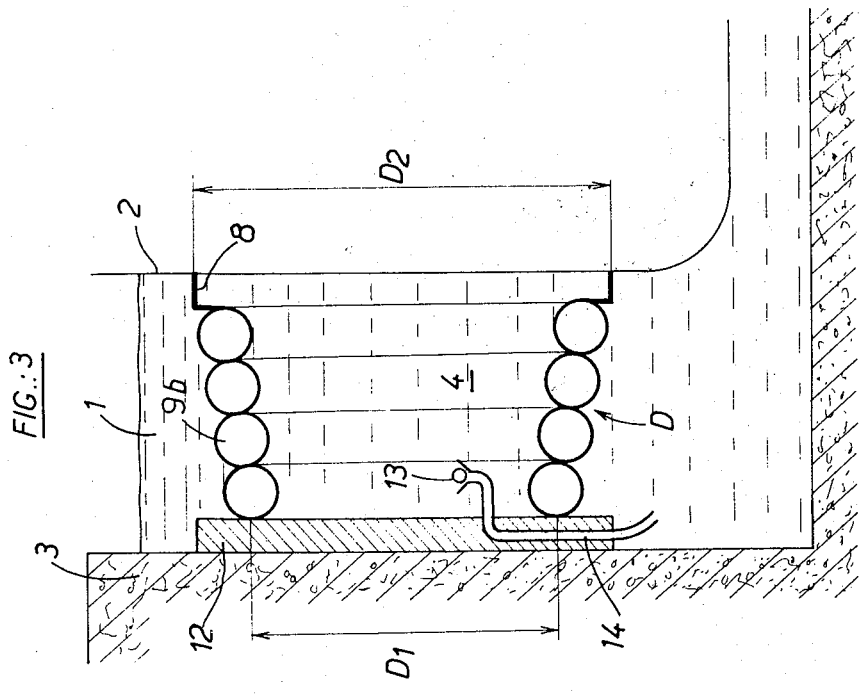

FENDER DEVICE FOR SHIPS AND OTHER BOATS

GUIENE U.S. Pat. No. 3,266,757 describes cargo platforms released from aircraft which carry loads and which are adapted on landing to produce a pressure cushion intended both to absorb the impact and avoid any danger of somersaulting on contact with the ground.

This invention is based on operating principles of the same general nature but in radically different field. It relates to an application of the pressure cushion to port fender installations for the berthing or the like of ships or the like, the said cushion being interposed between the hull of a ship and a quay or the hull of another ship and exerting a horizontal repelling force adapted to absorb the approach movement impacts while allowing relative movement without friction in a vertical plane perpendicular to the approach movement.

The fender system for performing the present invention may be of a similar design to that of the droppable platforms in the above-mentioned patent, to which reference should be made, but is of a different design and assembly: the fender system according to this invention is swung through about 90° in relation to the droppable platforms and is also fixed either to a quay or to a ship's hull and is submerged, the pressure fluid of the cushion being water, an incompressible fluid.

According to one embodiment of this invention, the cushion water is pressurised by crushing a deformable chamber containing the water, by the action of the ship's hull on the approach movement of the ship. A suitable return means "re-inflates" the chamber after such crushing in order to regenerate it for a fresh pressure cushion fender operation.

In an alternative embodiment, the cushion is continuously fed by a pump started on the approach movement of the ship and kept in operation for the entire berthing period. The fender system may then be either submerged or out of the water, in which latter case it may be fed with compressed air delivered by a compressor.

The invention will be more readily understood from the following description with reference to the accompanying drawings, which is given by way of example without limiting force.

FIG. 1 is a diagrammatic vertical section illustrating one embodiment of this invention.

FIGS. 2, 3 and 4 are similar views showing three alternative embodiments.

Referring to the drawings, reference 1 denotes the body of water, reference 2 the hull of the ship and reference 3 a quay (or alternatively the hull of another ship), the fender system D being interposed as usual between 2 and 3 and possibly being fixed to either.

In the embodiment shown in FIG. 1, the fender comprises a chamber 4 having a side wall 5, for example a sleeve of rubberised cloth, which has a cylindrical, frusto-conical or similar shape in extension, and an end formed by a plate 6 having one or more apertures 7 and an outwardly projecting peripheral lip 8. Referring to the drawings, the cloth 5 is folded over to form an annular housing for a series of toric tubes 9 which are superposed or wound helically and act as an air chamber or a chamber for some other gas and communicate via a tube 10 with a bladder or flexible bag 11 situated in the water at a lower level.

A fender system of this kind operates as follows:

When the hull 2 approaches the quay 3, it crushes the deformable chamber 4 and the water which fills the latter, being laterally contained by the waterproof cloth 5, is pressurised by the crushing effect. Since water is incompressible, it is necessarily ejected solely via the or each aperture 7 in the plate 6 into a cushion space between 6 and hull 12, forming a pressure water cushion with lateral leakage at the peripheral lip 8. Thus cushion produces a "ground effect" which tends to move the hull 2 away from the quay 3 but without exerting any solid/solid material friction on the hull, which is free to move in the vertical plane perpendicular to that of FIG. 1 under the action of the tide, sea, current, etc. This results in what is known as a "daylight clearance" between lip 8 and hull 2.

To obtain correct operation, the resultant of the forces exerted on the fender system D must tend to create a clearance between the free edge of the lip 8 and the movable body consisting of the ship's hull 2. To this end, the effective area $S_2$ of the cushion is greater than the internal cross-section $S_1$ of the deformable chamber 4, so that disregarding the pressure loss on the plate 6 this gives a compression effect on the flexible wall 5.

The tubes 9 are crushed at the same time as the chamber 4 and thus expel the gas they contain to the bladder 11 which inflates. Since the bladder is subject to the hydrostatic pressure of the column of water above it, it will return the gas to the tubes 9 as soon as the hull 2 moves away from the quay 3, thus producing a return force which "re-inflates" the chamber 4 and the latter fills with water via the apertures 7 in the plate 6.

In the alternative embodiment shown in FIG. 2, the tubes 9a are filled with liquid and communicate via a hose 10a with an outdoor tank 11a situated at a higher level. The return force is produced in a similar way to the preceding embodiment.

It would also be possible to use a spring of some tens of kilograms interposed between the quay 3 and the plate 6, but it would have to be protected against marine corrosion.

The cloth 5 could also be dispensed with, by using the return tubes to provide lateral sealing-tightness of the chamber 4 as shown in FIG. 3, in which contiguous air chambers 9b are shown, which form a casing fixed in sealing-tight relationship at one end to a closure plate 12 fixed to the quay 3 and remote from the peripheral lip 8. The air chambers 9b may be replaced by tubes lined with a cellular elastomer or consisting of an internally reinforced elastomer.

In this embodiment, the casing 9b is of a general frustoconical shape flaring outwardly from an end section of diameter $D_1$ at the closure plate 12 to an end section of diameter $D_2$ greater than $D_1$ at the lip 8. This geometry means that any internal pressure rise in the chamber 4 tends to compress the tubes 9b slightly and maintain the peripheral leakage clearance for the water cushion when the hull 2 is close to the quay 3, thus rendering the ported plate 6 in the previous embodiments unnecessary. A similar result would also be obtained with a casing 9b of a general cylindrical shape, provided of course that the condition $D_2 > D_1$ is met.

Still referring to the alternative embodiment shown in FIG. 3, a valve 13 is connected to the system D and to the surrounding water via a tube 14. The valve closes when the chamber 4 is compressed and then the water it contains must escape via the peripheral lip 8 as previously, with the cushion being formed; on the other hand, when the hull 2 moves away from the quay 3 and the internal pressure drops, the water can flow in via the valve 13 and this obviates a sucker effect between the fender D and the hull 2. A self-contained pumping system is thus formed so that when the ship is berthed the small movement amplitudes maintain a certain liquid buffer between the fender and the ship.

When a ship is moving alongside a quay, the above-described embodiments give a braking effect with a substantially constant deceleration of the movements perpendicular to the guay, by means of a water cushion fender and without any material contact with the ship. Such a fender, however, cannot maintain the ship at a given distance from the guay with an appreciable force.

The system shown in FIG. 4 allows the vessel to be stabilised at some distance from the quay in a defined position, the ship being in equilibrium under the action of two opposite forces: the force resulting from the hawser tension and the force due to the action of the water cushion, allowing for any wind.

The frustoconical chamber 4 is in this case fed with water continuously by a pump 15 disposed, for example, on the quay 3. This pump draws water from the sea via a pipe 16 through a strainer 17 and delivers this water via a pipe 18 to the interior of the chamber 4. The pump 15 is started when the vessel 2 approaches the guay 3 and is maintained in operation while the ship is berthed. No automatic return system is required in this case, the pump 15 being used for the purpose.

In every case, the quay fender D is produced without there being any permanent contact between the hull 2 and the lips 8 of the cushion, thus allowing vertical and horizontal movements of the ship parallel to the quay 3 and the damping of movements perpendicular thereto.

We claim:

1. A bracing method to maintain the hull structure of a ship and a quay structure or the hull structure of another ship at a given distance apart irrespective of external forces tending to bring them together, without any permanent solid/solid physical contact between them, thus allowing frictionless relative displacements of the said structures in a vertical plane perpendicular to the said distance apart, comprising the steps of providing a cushion space upon a substantial area of one of said structures with allowance of a restricted peripheral daylight clearance extending all around said area, reserving a collapsible volume of fluid which communicates with said cushion space and is backed upon a substantial area of the other of said structures, and permanently delivering fluid into said volume during the entire period of berthing of the ship to maintain normally said collapsible volume extended and to re-extend it after collapse due to too-close proximity of said structures, whereby a pressurized fluid cushion builds up in said cushion space notwithstanding fluid leakage through said restricted peripheral daylight clearance and exerts a "ground effect" which opposes the relative approach movement of said structures with a repelling force representing the product of cushion pressure and the former-mentioned area.

2. A method according to claim 1, wherein the former-mentioned area is larger than the latter-mentioned area.

3. A fender system adapted to be interposed between the hull structure of a ship and a quay structure or the hull structure of another ship in order to produce a horizontal repelling force opposing the relative approach movement thereof while allowing frictionless relative displacements thereof in a vertical plane perpendicular to the said relative approach movement, wherein the improvement comprises submerged cushion seal means for containing a water cushion backed upon a substantial area of one of said structures with allowance of a restricted peripheral daylight clearance extending all around said area, substantially watertight flexible wall means bounding a submerged water-filled deformable chamber backed upon a substantial area of the other of said structures and communicating with said cushion for feeding the same with water which is pressurized by crushing the said chamber under the action of the ship's hull on the approach movement of the ship, and a return means to "re-inflate" the said chamber after such crushing in order to regenerate it so that it can produce a fresh pressure cushion.

4. A system according to claim 3, wherein the former-mentioned area is larger than the latter-mentioned area.

5. A system according to claim 3, wherein said return means comprises superposed tubes adapted to be crushed on the approach movement of the ship's hull but resuming their original shape with a resilient return effect on movement of the hull away therefrom.

6. A system according to claim 5, wherein the tubes form a gas chamber, said system comprising a gas containing inflatable bag-like bladder submerged at a level below that at which the deformable chamber is submerged and communicating therewith.

7. A system according to claim 5, wherein the tubes form a liquid chamber, said system comprising a liquid containing tank disposed at a higher level than that at which the deformable chamber is submerged and communicating therewith.

8. A system according to claim 5, wherein the tubes are lined with cellular elastomer or are made from an internally reinforced elastomer.

9. A system according to claim 5, further comprising a sleeve of impermeable and deformable material in which the said tubes are housed.

10. A system according to claim 5, wherein the said tubes are contiguous and form a sealing-tight lateral casing surrounding the deformable chamber.

11. A system according to claim 10, wherein the contiguous tubes define a chamber having a general frustoconical shape flaring towards said seal means.

* * * * *